United States Patent [19]
Denker

[11] Patent Number: 5,958,053
[45] Date of Patent: *Sep. 28, 1999

[54] COMMUNICATIONS PROTOCOL WITH IMPROVED SECURITY

[75] Inventor: John Stewart Denker, Leonardo, N.J.

[73] Assignee: AT&T Corp., Middletown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/916,439

[22] Filed: Aug. 22, 1997

Related U.S. Application Data

[60] Provisional application No. 60/036,060, Jan. 30, 1997.

[51] Int. Cl.⁶ .............................. G06F 11/00; H04K 1/00
[52] U.S. Cl. ........................................ 713/201; 709/227
[58] Field of Search ................................ 395/187.01, 186, 395/188.01, 183.15, 200.54, 200.55, 200.57, 200.6, 200.67; 380/23, 25, 3, 4

[56] References Cited

U.S. PATENT DOCUMENTS

| | | | |
|---|---|---|---|
| 5,311,593 | 5/1994 | Carmi ......................................... | 380/23 |
| 5,511,122 | 4/1996 | Atkinson .................................... | 380/25 |
| 5,572,678 | 11/1996 | Homma et al. ..................... | 395/200.12 |
| 5,675,740 | 10/1997 | Heimsoth et al. .................. | 295/200.12 |
| 5,684,951 | 11/1997 | Goldman et al. ................... | 395/188.01 |
| 5,754,752 | 5/1998 | Sheh et al. .......................... | 395/182.02 |

OTHER PUBLICATIONS

Brown et al. "Secure File Transfer Over TCO/IP", IEEE Region 10 Conf. pp. 494–498, Nov. 1992.

Ramaswamy, "A Security Archictecture and Mechanism for Data Confidentiuality in TCP/IP Protocols", SEcurity and Privacy, IEEE Symposium, pp. 249–259, 1990.

Stallings "IPV6: The New Internet Protocol", IEEE Communications Magazine, pp. 96–108, Jul. 1996.

Guha et al., "Network Security via Reverse Engineering of TCP Code: Vulnerability Analysis and Proposed Solutions" Infocom, IEEE, pp. 603–610, 1996.

RCF793, Transmission Control Protocol, DARPA Internet Program Protocol Specification, Sep., 1981, pp. 1–85.

Statements from Public Access Networks Corporation (PANIX), Sep., 1996, one page.

"IP–Spoofing Demystified, Trust–Relationship Exploitation," Phrack Magazine, vol. 7, Issue Forty–eight, Jun., 1996, pp. 1–9.

Syncookies Mailing List Archives, pp. 1–15.

Bellovin, S.M., Security Problems in the TCP/IP Protocol Suite, Computer Communications Review, vol. 19, No. 2, Apr. 1, 1989, pp. 32–48.

Guha, B., et al., Network Security via Reverse Engineering of TCP Code: Vulnerability Analysis and Proposed Solutions, Proceedings of IEEE Infocom 1996, Conference on Computer Communications, Mar. 24–28, 1996, vol. 2, No. conf. 15, Mar. 24, 1996, Institute of Electrical and Electronics Engineers, pp. 603–610.

(List continued on next page.)

*Primary Examiner*—Joseph E. Palys

[57] ABSTRACT

The protocol of the present invention includes two new first level protocols and several embodiments of a second level protocol. The two new first level protocols of the present invention include the TCP2B protocol and the TCP2E protocol. In the TCP2B protocol, both client and server indicate their support for this protocol using one or more bits in TCP header. According to the TCP2B protocol, the client retransmits its requested options in the ACK message so the server need not store the options after the connection request. In the TCP2E protocol, the server maintains a Friends Table listing addresses of device recently observed to be complying with TCP. If a client's address is on the Friends Table, the connection request is processed according to TCP. Otherwise, the server sends an ACK message to the client to prompt the client to send a reset message. The client's address can then be added to the Friends Table.

30 Claims, 11 Drawing Sheets

OTHER PUBLICATIONS

Reid, J., Open Systems Security, Traps and Pitfalls, Computers & Security International Journal Devoted to the Study of Technical and Financial Aspects of Computer Security, vol. 14, No. 6, Jan. 1, 1995.

Hastings, N.E., et al., TCP/IP Spoofing Fundamentals, Proceedings of the 1996 IEEE Fifteenth Annual International Phoenix Conference on Computers and Communications, Scottsdale, Mar. 27, 1996 No. conf. 15, Mar. 27–29, 1996, Institute of Electrical and Electronics Engineers, pp. 218–224.

FIG. 1
(PRIOR ART)

| STATE/STEP | CLIENT STATE | MESSAGE TRANSFERRED | SERVER STATE |
|---|---|---|---|
| 10A | CLOSED | | LISTEN |
| 1020A | | <SEQ=100><CTL=SYN><OPT=...> → | |
| 20A | SYN-SENT | | SYN-RECEIVED |
| 2030A | | <SEQ=300><ACK=101><CTL=SYN.ACK> ← | |
| 30A | ESTABLISHED | | SYN-RECEIVED |
| 3040A | | <SEQ=101><ACK=301><CTL=ACK> → | |
| 40A | ESTABLISHED | | ESTABLISHED |
| 4050A | | <SEQ=101><ACK=301><CTL=ACK><DATA> → | |
| 50A | ESTABLISHED | | ESTABLISHED |

FIG. 2
(PRIOR ART)

| STATE/STEP | CLIENT STATE | MESSAGE TRANSFERRED | SERVER STATE |
|---|---|---|---|
| 10B | CLOSED | | LISTEN |
| 1020B | | <SEQ=100><CTL=SYN><OPT=...> → | |
| 20B | SYN-SENT | | LISTEN |
| 2030B | | <SEQ=$c><ACK=101><CTL=SYN.ACK> ← | |
| 30B | ESTABLISHED | | LISTEN |
| 3040B | | <SEQ=101><ACK=$c+1><CTL=ACK> → | |
| 40B | ESTABLISHED | | ESTABLISHED |
| 4050B | | <SEQ=101><ACK=$c+1><CTL=ACK><DATA> → | |
| 50B | ESTABLISHED | | ESTABLISHED |

FIG. 4

| STATE/STEP | CLIENT STATE | MESSAGE TRANSFERRED | SERVER STATE |
|---|---|---|---|
| 10C | CLOSED | | LISTEN |
| 1020C | | <SEQ=100><CTL=SYN><OPT=..., TCP2B1> → | |
| 20C | SYN-SENT | | SYN-RECEIVED |
| 2030C | | <SEQ=300><ACK=101><CTL=SYN.ACK><OPT=TCP2B2.$c> ← | |
| 30C | ESTABLISHED | | SYN-RECEIVED |
| 3040C | | <SEQ=101><ACK=301><CTL=ACK><OPT=..$c> → | |
| 40C | ESTABLISHED | | ESTABLISHED |
| 4050C | | <SEQ=101><ACK=301><CTL=ACK><DATA> → | |
| 50C | ESTABLISHED | | ESTABLISHED |

FIG. 5
(PRIOR ART)

| STATE/STEP | CLIENT STATE | MESSAGE TRANSFERRED | SERVER STATE |
|---|---|---|---|
| 05D | (CRASHED) | | ESTABLISHED EXPECTING TO RECEIVE #100 READY TO SEND #300 |
| 10D | CLOSED | | ESTABLISHED |
| 1020D | | <SEQ=400><CTL=SYN><OPT=...> → | NOTE SURPRISING SYN FLAG |
| 20D | SYN-SENT | | (??) |
| 2030D | NOTE SURPRISING ACK NUMBER | ← <SEQ=300><ACK=100><CTL=ACK> | |
| 30D | (!!) | | ESTABLISHED |
| 3040D | | <SEQ=100><CTL=RST> → | (ABORT) |
| 40D | SYN-SENT | | CLOSED |
| 4050D | | <SEQ=400><CTL=SYN><OPT=...> → | |
| 50D | SYN-SENT | | SYN-RECEIVED |
| 5060D | | ← <SEQ=300><ACK=401><CTL=SYN.ACK> | |
| 60D | ESTABLISHED | | SYN-RECEIVED |
| 6070D | | <SEQ=401><ACK=301><CTL=ACK> → | |
| 70D | ESTABLISHED | | ESTABLISHED |
| 7080D | | <SEQ=401><ACK=301><CTL=ACK><DATA> → | |
| 80D | ESTABLISHED | | ESTABLISHED |

FIG. 6

| STATE/STEP | CLIENT STATE | MESSAGE TRANSFERRED | SERVER STATE |
|---|---|---|---|
| 10E | CLOSED | | LISTEN (FT=X) |
| 1020E | | <SEQ=400><CTL=SYN><OPT=...> → | |
| 20E | SYN-SENT | | LISTEN (FT=X) |
| 2030E | NOTE SURPRISING ACK NUMBER | ← <SEQ=??><ACK=$c><CTL=ACK> | |
| 30E | (!!) | | LISTEN (FT=X) |
| 3040E | | <SEQ=$c><CTL=RST> → | |
| 40E | SYN-SENT | | LISTEN (FT=X+ CLIENT'S ADDRESS) |
| 4050E | | <SEQ=400><CTL=SYN><OPT=...> → | |
| 50E | SYN-SENT | | SYN-RECEIVED |
| 5060E | | ← <SEQ=300><ACK=401><CTL=SYN.ACK> | |
| 60E | ESTABLISHED | | SYN-RECEIVED |
| 6070E | | <SEQ=401><ACK=301><CTL=ACK> → | |
| 70E | ESTABLISHED | | ESTABLISHED |
| 7080E | | <SEQ=401><ACK=301><CTL=ACK><DATA> → | |
| 80E | ESTABLISHED | | ESTABLISHED | ns to the incipient connection, whereas the client has# COMMUNICATIONS PROTOCOL WITH IMPROVED SECURITY

CROSS-REFERENCE TO RELATED APPLICATIONS

This application claims the benefit of U.S. Provisional Application No. 60/036,060, filed Jan. 30, 1997.

BACKGROUND

The present invention relates to communication networks and more particularly to a communications protocol with improved security.

Much of the traffic on the Internet uses the Transmission Control Protocol, TCP. The details of TCP are specified in a document known as RFC793. Well-known Internet protocols and applications such as Telnet and HTTP rely on TCP to send and receive messages.

Security experts have known for years that TCP was vulnerable to various forms of abuse. In June, 1996, the on-line hacker magazine *Phrack* published a detailed discussion of the vulnerabilities of TCP. Starting Friday, Sep. 6th, 1996, saboteurs used some of these weaknesses to attack Public Access Networks Corporation. The company's nickname is PANIX. The attack was of the type called SYN Flooding, or a SYN Flood Attack, as will be discussed more below. The result of the attack was that users on the Internet were unable to fetch Web pages or other information from the PANIX servers. (This attack affected primarily the Web hosting component of PANIX's business, not the component that provides Internet access to consumers via modems.) The SYN Flood attack worked to the great detriment of the (roughly) 6000 individuals and 1000 companies who used PANIX to host their Web pages and other information. There is reason to believe that institutions other than PANIX have been attacked, but have chosen not to publicize the fact.

In simplest terms, the nature of a SYN Flood Attack is as follows: To set up a TCP connection between a client and a server, a series of three Internet Protocol (IP) messages should be exchanged. If the client reneges on the protocol in the middle of this exchange, there can easily arise a situation where the server has already committed considerable resources to the incipient connection, whereas the client has not. By sending (and reneging on) a vast number of TCP setup requests, a client (if it has relatively modest resources) can overload a server (even if it has relatively vast resources). Once a server is overloaded, the machine can no longer respond to legitimate connection requests.

A key element of this scenario is that under IP version 4 (IPv4, which is the basis of the current Internet), the part of an IP packet that identifies the sender (the source IP address) might (intentionally or otherwise) be incorrect. This is called IP spoofing. Because packets can be sent with an incorrect source IP address, it is very difficult to track down a client that is (maliciously or otherwise) violating the TCP protocol. This also makes it difficult to distinguish between attack packets and legitimate connection requests.

FIG. 1 is a state table which illustrates the basic three-way handshake for connection synchronization for TCP. In FIG. 1, client and server states are represented with three digit numbers (i.e., 10A, 20A, 30A), while transitions or steps performed between states are represented with five digit numbers (i.e., 1020A, 2030A). For example, step 1020A is the step performed between states 10A and 20A.

Referring to FIG. 1, in state 10A, the client is closed (no connection), while the server is listening for synchronization requests (a request to open a TCP connection). In step 1020A, the client sends a synchronization (SYN) message to the server with a request to open a TCP connection. The synchronization flag (SYN) is set to indicate that the three-way TCP connection handshake is in process (i.e., the two sides are synchronizing the TCP connection). Also, the client establishes the uplink (client to server) initial sequence number (100 in this example) in step 1020A. In state 20A, the server receives the SYN message from the client and goes into the SYN-RECEIVED state, while the client is in the SYN-sent state (indicating that the client has sent a SYN message).

Next, in step 2030A, the server sends a SYNACK message (both SYN and ACK flags are set) to the client, establishing the downlink (server to client) initial sequence number (300 in this example). Also, the acknowledgment number is set to 101, and the ACK and SYN flags are both set. Setting the SYN flag indicates that the TCP synchronization process is continuing. Setting the ACK flag to one indicates that the acknowledgment number is valid. The acknowledgment number of 101 in the SYNACK message of step 2030A acknowledges receipt from the client of the SYN message. (In general, an acknowledgment number acknowledges receipt of all messages having a sequence number less than the acknowledgment number.) The client then receives the SYNACK message sent from the server, and the connection is now established only on the client's side, state 30A.

In step 3040A, the client sends a message acknowledging receipt of the SYNACK message by setting the ACK flag and setting the acknowledgment number to 301. After these three messages have been transferred, the connection is fully established, state 40A. In step 4050A, the client sends data to the server.

In a SYN Flood attack, the attacking client sends a packet with the SYN flag set (just like step 1020A). The server sends the ordinary response, (i.e., a packet with the SYN and ACK flags set, step 2030A), but the client never responds with the ACK message (step 3040A). Indeed, in the typical case that the IP address specified in the original SYN message was bogus, the attacking client will never even receive the SYNACK message.

It can be assumed that in an attack packet, the source IP address corresponds neither to the attacker's machine nor to any other TCP-compliant machine. This is because if any other compliant machine were to receive the SYNACK message of step 2030, it would immediately respond by sending a reset (RST) message to the server, aborting the incipient connection and releasing the associated resources.

Ordinarily, when the server goes into the SYN-RECEIVED state, it allocates some amount of memory for the connection. At the very least, the server should remember that a SYN message was received with the given sequence number (100 in this example), and the client's IP address and port number. In addition, since the client can specify important option information in the option fields (OPT) of the SYN message, the server should also store the option information when possible.

One problem is that server implementations that do not take into account the possibility of a SYN Flood attack typically allocate not just the bare minimum amount of memory, but allocate in memory a full-blown Transmission Control Block after receiving a SYN message to store all the required information for the connection with the expectation that the incipient connection will soon become a fully-established connection. The damage done by a SYN flood attack grows linearly with the amount of memory allocated. Eventually, the incipient connection will time out, whereupon the allocated resources will be released. This means that the damage done by a SYN flood attack grows in proportion to the timeout parameter.

Several techniques have been proposed for defending against SYN Flooding. For example, there is an effort to deploy IP version 6 (IPv6) which may eliminate IP spoofing using public key encryption. On the other hand, the IPv6 solution is expected to require complex management of cryptologic keys. Furthermore, there are tens of millions of machines around the world that rely on the current IP (i.e., IPv4) and TCP specifications, and it is quite impractical to upgrade them in the short term. Therefore it is highly desirable to find defenses that operate effectively with existing IPv4/TCP clients and other protocols which may be vulnerable to a SYN Flood attack.

Because the attacking client needs to invest a slight amount of computation resources, a slight amount of communication resources, and zero memory storage resources, it is desirable to find a defense where the server commits only proportional amounts of resources, namely modest computation, modest communication, and, if at all possible, zero memory.

One defense to SYN flooding is known as the Syncookie method of Bernstein and Schenk (Bernstein/Schenk Syncookie method). FIG. 2 is a state table which illustrates the basic handshake for the Bernstein/Schenk Syncookie method. The Syncookie handshake of FIG. 2 is similar to the handshake of FIG. 1, except in FIG. 2, the server's Initial Sequence Number (generated for use in the SYNACK message at step 2030B) is represented by $c. The server's Initial Sequence Number ($c) is generated by the server as a cryptologic function (such as the MD5 message-digest algorithm or some other hash function) based upon the client's Initial Sequence Number (100 in this example), the client's IP address, and a secret known only to the server, among other things. Then in the simplest case, it is unnecessary for the server to store any information in memory (such as a client sequence number or source IP address) after receiving the SYN message of step 1, because when the server receives the message of step 3040B, the server can immediately check if the incoming acknowledgment number matches the appropriate hash function output. If a match is found, then the acknowledgment must have come in reply to a SYNACK message from this server, and the server can therefore trust the client and (after receiving the ACK message of step 3040B) allocate whatever resources will be needed by the connection, which can now be considered fully established.

The server's choice of $c is mildly restricted by the need to recognize and shut down half-open connections, such as arise when the server or client crashes while a connection is open between them. A more significant restriction is that the server's value for $c should encode, to a sufficient approximation, the source IP address and port number, and (if possible) all important information carried by the option (OPT) fields in the original SYN message. There are, however, limits on the number of bits that can be encoded using the Syncookie method. In practice this means that certain client-requested options the server would otherwise honor must be discarded under the Syncookie method because there is insufficient space (only 32 bits) available in the sequence number to encode the options.

The limited ability to encode and honor TCP options is a major drawback to the Syncookie method. There are several client-requested options which may be present in the TCP header which are important and should be implemented by the server. For example, the most common TCP option is to specify a maximum segment size (MSS). Clients can avoid segment fragmentation and thereby improve TCP circuit performance by letting the server know the largest segment size it is willing to accept. The Syncookie method makes some provision for handling the MSS option, but must make approximations.

An additional refinement has been proposed to the Syncookie method. A server may be under attack only sporadically. At times when it is not under attack, it can recognize this fact, and can respond normally, allocating memory after step receiving the SYN message of step 1020B (rather than waiting until after receiving the message of step 3040B), and honoring all options normally.

Matt Blaze and collaborators proposed a slightly different scheme involving cookies, i.e. having the server encode information in its Initial Sequence Number. One useful idea in their proposal is the idea of a Friends Table, i.e. a table in the server's memory that tabulates the IP address of clients that have been recently observed to be complying with important parts of the TCP protocol. Their proposal revolved around a five-step handshake which imposes a noticeable performance penalty relative to the traditional three-step handshake. Another drawback to Matt Blaze's proposal was the use of a timeout. Since TCP timeout intervals are typically long compared to Internet round-trip times, the use of the timeout imposes an additional performance penalty.

Therefore, there is a need for an improved protocol which provides protection against SYN Flooding and which is compatible with the current version of TCP/IP. In addition, there is a need for an improved protocol which allows the server flexibility to implement options even when under attack, and which imposes a shorter delay than provided by the prior art techniques.

SUMMARY OF THE INVENTION

The protocol of the present invention includes two new first-level protocols and several embodiments of a second-level protocol. The two new first-level protocols of the present invention include the TCP2B protocol and the TCP2E protocol. Both TCP2B and TCP2E are extensions of TCP. The second-level protocol is a protocol at a higher level than the first level protocols and determines which of several first level protocols should be used under different circumstances. The protocols of the present invention provide excellent protection against SYN Flooding because minimal resources are allocated in response to a SYN message, while permitting the server to implement all client requested options.

In the TCP2B protocol according to an embodiment of the present invention, the client requests a TCP connection with a server using a SYN message. The client indicates its support for the TCP2B protocol of the present invention using one or more bits of the TCP header (such as the OPT field). In response to receiving the SYN message, the server then sends a SYNACK message indicating the server's support for the TCP2B protocol. The SYNACK message includes an encoded value as a mathematical (i.e., cryptologic) function of at least the client's address and a secret known only to the server. In response to the SYNACK message indicating the server's support for TCP2B, the client sends an ACK message to the server. This ACK message (in addition to the information required by standard TCP) includes the encoded value and repeats the client's requested options. The server then analyzes the encoded value in the ACK message to determine if it passes the appropriate mathematical (i.e., cryptologic) test. If the encoded value included in the ACK message passes the appropriate mathematical test, then the client is properly complying with the TCP2B protocol, and the server allocates a full Transmission Control Block in memory, and the connection becomes fully established.

In the TCP2E protocol according to an embodiment of the present invention, the server maintains a Friends Table, which is a list of addresses of those devices recently observed to be complying with TCP. The client requests a TCP connection with a server using a SYN message. The server then determines whether the address of the client is on the server's Friends Table.

If the client's address is not on the server's Friends Table, the server calculates an encoded value. The encoded value is calculated as the mathematical function of at least the client's address and a secret (i.e., a random number) known only to the server. The server sends an ACK message to the client including the calculated encoded value as the acknowledgment number. Because the acknowledgment number does not acknowledge any messages previously sent by the client, this ACK message appears to the client as a half-open connection. The client responds by sending a reset message to the server, as required by the standard TCP specifications. If the reset message passes a mathematical test at the server, the server adds the client's address to the Friends Table. Then, in accordance with standard TCP, the client will again attempt to establish a TCP connection with the server by re-issuing the SYN message to the server. This SYN message (or packet) will be welcomed by the server, since the client's address is now in the Friends Table.

According to TCP2E, if the client's address is on the server's Friends Table, the connection request (i.e., received SYN message) is processed according to TCP. A counter associated with each address in the Friends Table can be used to keep track of the number of successful connections established as compared to the total number of connection requests from the client, and allow the server to expunge the client's address from the Friends Table if there are too many unsuccessful connection attempts.

BRIEF DESCRIPTION OF THE DRAWINGS

FIG. 1 is a state table which illustrates the basic three-way handshake for connection synchronization for TCP.

FIG. 2 is a state table which illustrates the basic handshake for the Bernstein/Schenk Syncookie method.

FIG. 4 is a state table which illustrates the TCP2B protocol for connection synchronization according to an embodiment of the present invention.

FIG. 5 is a state table which illustrates an example of a recovery from a half-open connection under TCP.

FIG. 6 is a state table which illustrates an example of the TCP2E protocol for connection synchronization according to an embodiment of the present invention.

DETAILED DESCRIPTION

The protocol of the present invention includes two new first-level protocols and several embodiments of a second-level protocol. As described herein, "first-level" protocols are protocols at the same level as TCP (FIG. 1) and the Bernstein/Schenk Syncookie method (FIG. 2). A "second-level" protocol is a protocol at a higher level than the first-level protocols and determines which of several first-level protocols should be used under different circumstances to process a connection request. First, a network environment will be described below. Next, the two new first-level protocols according to embodiments of the present invention will be described. Finally, the second-level protocol according to several embodiments of the present invention will then be described.

Network Environment

Figure 3:
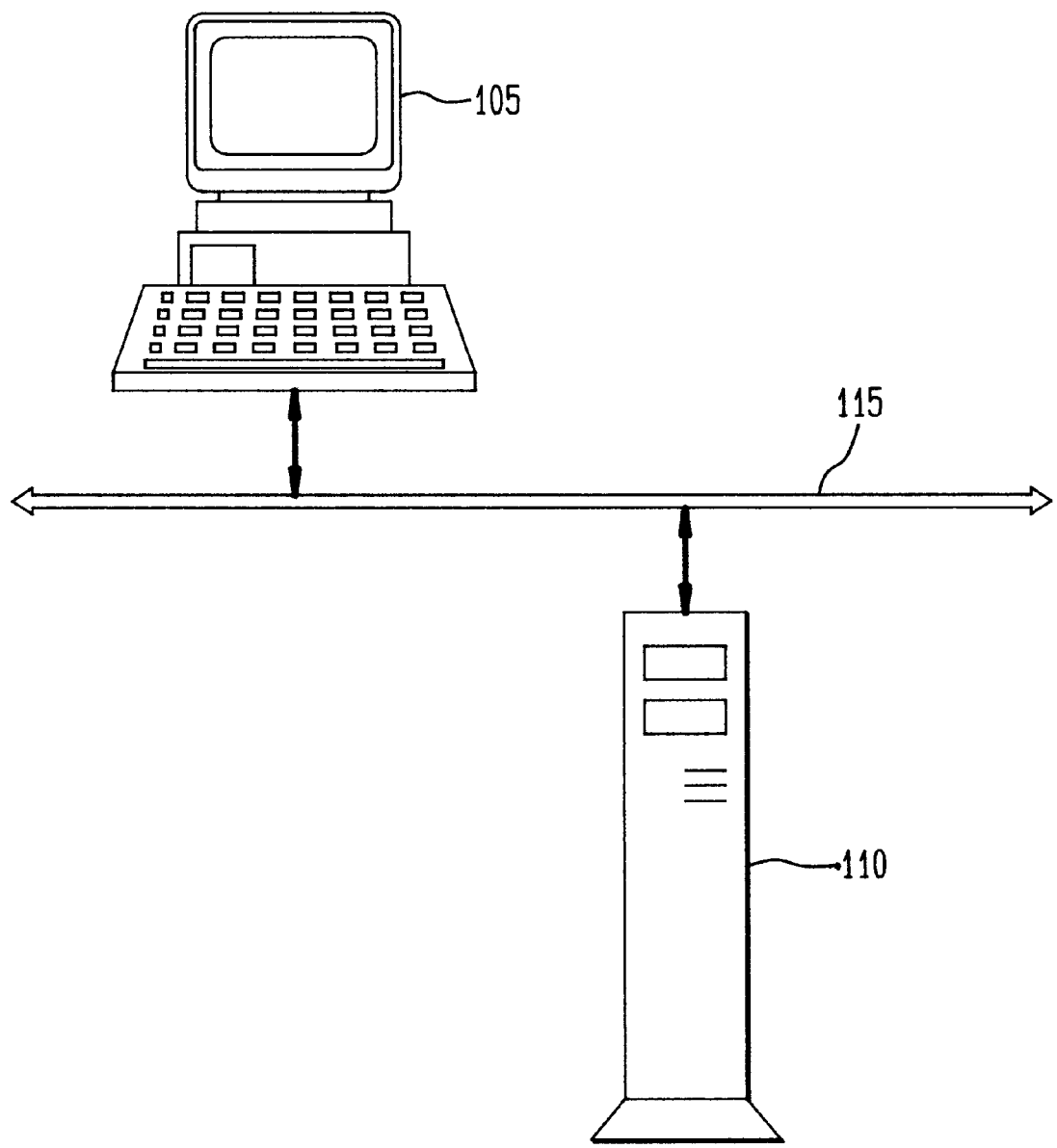
FIG. 3 illustrates an embodiment of a network environment which may be used with the present invention.

Referring to the drawings in detail, wherein like numerals indicate like elements, FIG. 3 illustrates a network environment 100 such as may be used with an embodiment of the present invention. Network environment 100 includes multiple devices including client 105 and server 110. The multiple devices of network environment 100, including client 105 and server 110, are coupled together via a network link 115. Network link 115 can be any combination of any one or more of a wide variety of conventional networks, such as a local area network (LAN), a wide area network (WAN), the Internet, the World Wide Web, an Intranet, etc. The link 115 may contain wired and wireless portions.

Typically, both client 105 and server 110 are conventional computers. Each includes a processor for executing software and controlling the operation of the respective machine, a hard disk drive (HDD) memory for storing software and other information, random access memory (RAM) for storing data and software, and a network interface, such as an Ethernet interface card, and other hardware components commonly present in computers. In each of client 105 and server 110, these hardware components are coupled together in a conventional manner via one or more busses (i.e., data bus, address bus, control bus) or electrical connections. Each of client 105 and server 110 has its own unique IP address. Each of client 105 and server 110 includes an implementation of TCP and IP in their respective memories for communicating with other computers via network link 115. Both client 105 and server 110 include an operating system, such as Linux. In addition, server 110 includes additional software for performing the protocols and methods of the present invention to defend against a SYN Flood attack from client 105 and from other devices, as described hereinbelow. Client 105 can also include additional software (i.e., TCP2B) to assist server 110 in defending against SYN Flood attacks, and to allow client 105 to obtain more-efficient service from server 110 when server 110 is under attack, as described below. Although the following explanation is provided in terms of a "client" 105 and a "server" 110, use of these types of computers is simply illustrative. The term "server" means a device which listens for and accepts TCP connection requests, and the term "client" means a device which initiates such requests. Both clients and servers can send and receive data. Any given device can be both a client and a server. The present invention is applicable to a wide variety of computers and other devices.

TCP2B and TCP2E First Level Protocols

Two new first-level protocols according to embodiments of the present invention include the TCP2B protocol and the TCP2E protocol and are described hereinbelow. Each of these first-level protocols is an extension of the TCP protocol and provides an improved defense to a SYN Flood attack.

TCP2B Protocol

FIG. 4 is a state table which illustrates the TCP2B protocol for connection synchronization according to an embodiment of the present invention. Prior to step 1020C of the TCP2B protocol, server 110 previously stored general information, including its own IP address, and a random secret (or number) known only to the server. In step 1020C, client 105 sends a SYN message to server 110 with a request to open a TCP connection. The SYN flag is set to indicate that the three-step TCP connection handshake is beginning. The sequence number is set to 100 (in this example) and the SYN message specifies several options in the options field of the TCP header. One of the specified options is the TCP2B option (OPT=TCP2B1) which is a new TCP option according to an embodiment of the present invention and indicates that client 105 supports the TCP2B protocol of the present invention. In alternative embodiments of the TCP2B protocol, the client and server may use bits in the TCP header other than the options field to indicate support for the TCP2B protocol. For example, one or more bits in the Reserved Field, or elsewhere in the TCP header may be used. Any properties of the TCP header can be used to specify support for the TCP2B protocol so long as both client 105 and server 110 are in agreement as to the way(s) in which TCP2B support can be specified. Preferably, industry-standard ways of specifying this will be established.

Server 110 then receives the SYN message of step 1 from client 105, state 20C. After receiving the SYN message of step 1020C, server 110 performs only the minimal communication and computation, and allocates no memory resources for the incipient connection. Server 110 sends a SYNACK message (in step 2030C) to client 105, with the sequence number set to 300 (in this example), the acknowledgment number set to 101 to acknowledge the SYN message of step 1020C, and with both the SYN and ACK flags set. The SYNACK message sent from server 110 in step 2030C also specifies a TCP2B option (OPT=TCP2B2) in the TCP header to inform client 105 that server 110 also supports the TCP2B protocol. As explained above, other bits in the TCP header may be used instead to indicate that server 110 supports the TCP2B protocol.

The SYNACK message of step 2030C also includes an encoded value (represented in FIG. 4 as $c). For security reasons, the encoded value $c can be calculated by server 110 as a cryptologic function (or other mathematical function) that depends upon at least the IP address of client 105 and a secret only known to server 110. The encoded value $c can be a cryptologic function which depends upon one or more additional parameters (in addition to the secret and the IP address of client 105), including: the client's port, the server's IP address, the server's port, and the client's sequence number, among other things. For example, the encoded value $c can be calculated by server 110 as follows:

$c=MD5 hash (client's IP address, client's port, server's IP address, server's port, random secret)+client's initial sequence number. (Eq. 1).

Equation 1 states that the encoded value $c can be calculated as the MD5 hash function of the client's IP address, the client's port, the server's IP address, the server's port and the random secret known only to server 110 plus the client's initial sequence number (shown as 100 in message 1).

Preferably, the encoded value $c will be passed as a numeric argument to the TCP2B option. Alternatively, the encoded value $c can be passed in other ways, such as in the sequence number or data field of the message. Passing the encoded value in the options field or the data field of the message has advantages over passing the encoded value in the sequence number. The main point is that there are certain restrictions on the sequence number. This would limit the choice of values for $c (possibly limiting the degree of security) and generally make the calculation more difficult. However, when $c is passed in the option and/or data field, many more bits are available (i.e., more than 32) and there are no inconvenient restrictions.

At state 30C, client 105 receives the SYNACK message of step 2030C and the connection is established on client 105's end. Client 105 then detects the TCP2B option set in the SYNACK message of step 2030C. This informs client 105 that the server 110 supports the TCP2B protocol.

In step 3040C, client 105 then sends an ACK message to server 110 with a sequence number set to 101, an acknowledgment number set to 301 to acknowledge the SYNACK message of step 2030C, and with the ACK flag set. Because client 105 was notified (via the TCP2B flag in the message of step 2030C) that server 110 also supports the TCP2B protocol, client 105 sets the options field in the ACK message of step 3040C to repeat whatever options it requested in the SYN message of step 1020C. The ACK message of step 3040C also includes the encoded value $c which was received in the message of step 2030C, or includes some encoded value that depends on $c. Typically, client 105 will have requested various options at step 1020C (in case server 110 does not support TCP2B) and will request them again in step 3040C (when server 110 informs client 105 that server 110 supports TCP2B). This second passing of options (in the ACK message of step 3040C) is not performed in standard TCP (see step 3040A of FIG. 1). This second passing of options means that in TCP2B, server 110 need not allocate memory to store information regarding the connection, including the options requested by client 105, until after server 110 receives the ACK message of step 3040C from client 105 (i.e., after the connection is fully established). At step 3040C the client 105 must also pass back to the server 110 the value $c (or information derived therefrom) so that the server will know that there is a working communication path from the server 110 to this client 105. Preferably this information will be passed as the argument to another option, OPT=TCP2B3, but it could be passed in other ways as discussed above.

Also note that in some cases (especially when the client does not know whether the server supports TCP2B) the message of step 1020C and step 3040C would include essentially identical sets of options. However, in other cases (especially when the client knows in advance that the server does support TCP2B) the client could choose to send a different set of options in step 3040C.

Regardless how the encoded value is passed, the client requested options are repeated in the ACK message of step 3040C, and therefore, need not be encoded in the value $c. As a result, the TCP2B protocol unburdens the encoded value $c.

After server 110 receives the ACK message of step 3040C, server 110 analyzes the encoded value passed in the ACK message of step 3040C to determine if it passes an appropriate mathematical (i.e., cryptologic) test. As one example of the appropriate mathematical test, server 110 recalculates the output of the mathematical function used previously by server 110 (to calculate the encoded value $c)

using the parameters passed in the message of step 3040C. In an embodiment where the encoded value $c is calculated as a mathematical function of the client's IP address and the secret known only to server 110, server 110 recalculates the encoded value using the client IP address provided in the message of step 3040C and the secret. In the embodiment where the encoded value $c of step 2030C was calculated as a cryptologic function of equation 1, the new calculated value can be calculated by server 110 as:

New calculated value $MD5$ hash (client's IP address$_{msg3}$, client's port$_{msg3040C}$, server's IP address $_{msg3040C}$server's port$_{msg3040C}$, random secret)+(client's sequence number$_{msg3040C}$-1). (Eq. 2).

Equation 2 states that the new calculated value can be calculated as the MD5 hash function of the random secret and the following parameters contained in the message of step 3040C: (the client's IP address, the client's port, the server's IP address, the server's port), plus the (sequence number in the message of step 3040C)-1.

Server 110 then compares the new calculated encoded value to the encoded value $c received by server 110 in the message of step 3040C. If these two values match, then the message of step 3 passes the cryptologic test and client 105 is properly complying with the TCP2B protocol, and that there is definitely a working connection in the direction from the server 110 to the client 105. This path can be traced to the client 105, facilitating corrections or sanctions if client 105 subsequently violates the protocol or abuses the connection. Server 110 then allocates a full Transmission Control Block in memory for storing all required information regarding the connection with client 105 (including the client requested options), and the TCP connection is now fully established, step 40C.

In step 4050C, client 105 provides data to server 110.

The TCP2B protocol has advantages over TCP and the Bernstein/Schenk Syncookie method.

As compared to TCP, TCP2B provides an improved defense against SYN flooding because server 110 (under TCP2B) does not allocate any memory resources for the connection until server 110 determines that the message of step 3040C passes the appropriate mathematical (i.e., cryptologic) test.

The TCP2B protocol improves over the Bernstein/Schenk Syncookie method by permitting the server to implement all of the client requested options without encoding the options with the other parameters in the 32 bit sequence number. In the Bernstein/Schenk Syncookie method, client requested options are not retransmitted in step 3040B (FIG. 2). It can be difficult or sometimes impossible to encode client requested options in the 32 bit sequence number in accordance with the Bernstein/Schenk Syncookie method. The TCP2B protocol of the present invention allows authentication information and option information to be sent separately, and relieves the client 105 and server 110 from the 32-bit limit, by providing for the client to resend the client requested options in the ACK message of step 3040C. As a result, the TCP2B protocol advantageously permits the server to implement the client requested options while protecting against a SYN Flood attack.

In yet another alternative embodiment of the TCP2B protocol, client 105 and server 110 do not use a separate TCP2B flag to indicate their support for the TCP2B protocol. Instead, client 105 selects an initial sequence number which satisfies a first unique mathematical test. For example, the client's initial sequence number could be selected from a set (known to both client 105 and server 110) of numbers that would not otherwise be likely to be chosen as initial sequence numbers. If server 110 receives a sequence number that appears on this set of numbers, then this indicates that client 105 supports the TCP2B protocol. Similarly, after detecting the client's support for the TCP2B protocol, server 110 could indicate its support for the TCP2B protocol by selecting its initial sequence from a similar set.

Recovering From A Half-Open Connection Under TCP

Before the TCP2E protocol is explained, the protocol for recovering from a half-open connection under TCP will be briefly discussed.

FIG. 5 is a state table which illustrates an example of a recovery from a half-open connection under TCP. An established connection is said to be half-open if one of the TCPs (client or server) has closed or aborted the connection at its end without the knowledge of the other, or if the two machines have become desynchronized due to a crash that caused one machine to lose its memory of the state of the connection. As illustrated in FIG. 5, such connections will automatically become reset if an attempt is made to send data in either direction. Recovery from a half-open connection under TCP is specified in RFC793 (September, 1981). FIG. 5 is adapted from RFC793 to illustrate recovery from a half-open connection under TCP.

Referring to FIG. 5, prior to state 05D, a TCP connection is fully established between client 105 and server 110. Prior to state 10D, server 110 is expecting to receive message number 100 (with a sequence number=100) from client 105 and is ready to send message number 300. Just prior to step 1020D, client 105 crashes and loses memory of the connection, state 05D. As a result, there is no connection on the client's end, while the connection still exists on the server's end, state 10D.

In attempt to establish a new connection, client 105 sends a message at step 1020C with a sequence number=400, with the SYN flag set, and with whatever options the client 105 cares to specify. Server 110 receives the SYN message of step 1020D, which has a sequence number outside the window which server 110 is expecting, state 20D.

Server 110 responds in step 2030D with an ACK message informing client 105 about the old connection, which server 110 still considers open.

Client 105 recognizes that the ACK message of step 2030D does not acknowledge the message that it just sent (message pertaining to the new connection), state 30D. In step 3040D, client 105, therefore, sends a reset (RST) message because it has detected a half-open connection. In response to the reset message, server 110 aborts the old connection(closing the connection at the server's end), state 40D.

In accordance with TCP, client 105 then sends a SYN message at step 4050D in a second attempt to establish the new connection with server 110. Naturally, the SYN message of step 4050D includes a restatement of the client-specified options. Steps 4050D, 5060D and 6070D of FIG. 5 are the same as the three step handshake (steps 1020A, 2030A and 3040A, respectively) of FIG. 1 to establish a TCP connection. After step 6070D, client 105 and server 110 have recovered from the half-open connection and fully reestablished the new connection.

TCP2E Protocol

According to an embodiment of the present invention, TCP2E relies upon the ability of a standard TCP client 105 to handle a half-open connection, and uses this to provide the server 110 with an improved defense to a SYN Flood attack.

Prior to step 1020E of the TCP2E protocol (FIG. 6), server 110 previously stored general information, including its own IP address, and a secret known only to the server 110. The secret is typically used for a plurality of connection requests.

According to an embodiment of the present invention, server 110 stores in memory a Friends Table, which is a table (such as a hash table or a list) maintained in server 110's memory containing the IP addresses (or other identifying information) of clients that have been recently observed to be complying with important parts of the TCP protocol. The Friends Table may be of constant size, such as one thousand IP addresses. In one embodiment of the present invention, server 110 adds a client's IP address to the server's Friends Table after a TCP connection has been established between the server and client using any first level protocol (i.e., TCP, Bernstein/Schenk Syncookie method, TCP2B, TCP2E). Also, importantly, a client's address can be added to the server's Friends Table when the client has complied with the initial steps of TCP2E as described below. If it is necessary to add a new IP address to the Friends Table and there are no free slots, a slot can be made available using a well known method such as random-replacement (where a random IP address is expunged) or least-recently-used (where the least recently used IP address in the table is expunged) to free up a slot for the new IP address.

In addition, the server's Friends Table can include a counter associated with each client's address in the Friends Table. When an address is added to the Friends Table, its associated counter is initialized to a specific value (e.g. five). The counter is then decremented each time server 110 enters the SYN-Received stated (i.e., after receiving a SYN message from the associated IP address). In an alternative embodiment, the counter is also decremented every X seconds after server 110 enters the SYN-Received state until the connection is fully established (i.e., after receiving the ACK message of step 6). The time interval X can be adjusted by server 110. The counter for an IP address in the Friends Table is incremented by a fixed number (for example two) after the connection between the client and server 110 is fully established. When the counter reaches zero, the corresponding IP address is expunged from the server's Friends Table. The purpose of the counter in the Friends Table is to keep track of how many unsuccessful attempts were made by this "friendly" client to establish a TCP connection with server 110. If there are too many failed connection attempts as compared to the number of successful connection attempts, the privilege of being on the server's Friends Table will be revoked by expunging the client's IP address from the Friends Table. The counter can prevent clients from abusing the Friends Table and provides additional protection against a SYN Flood attack.

Figure 7:
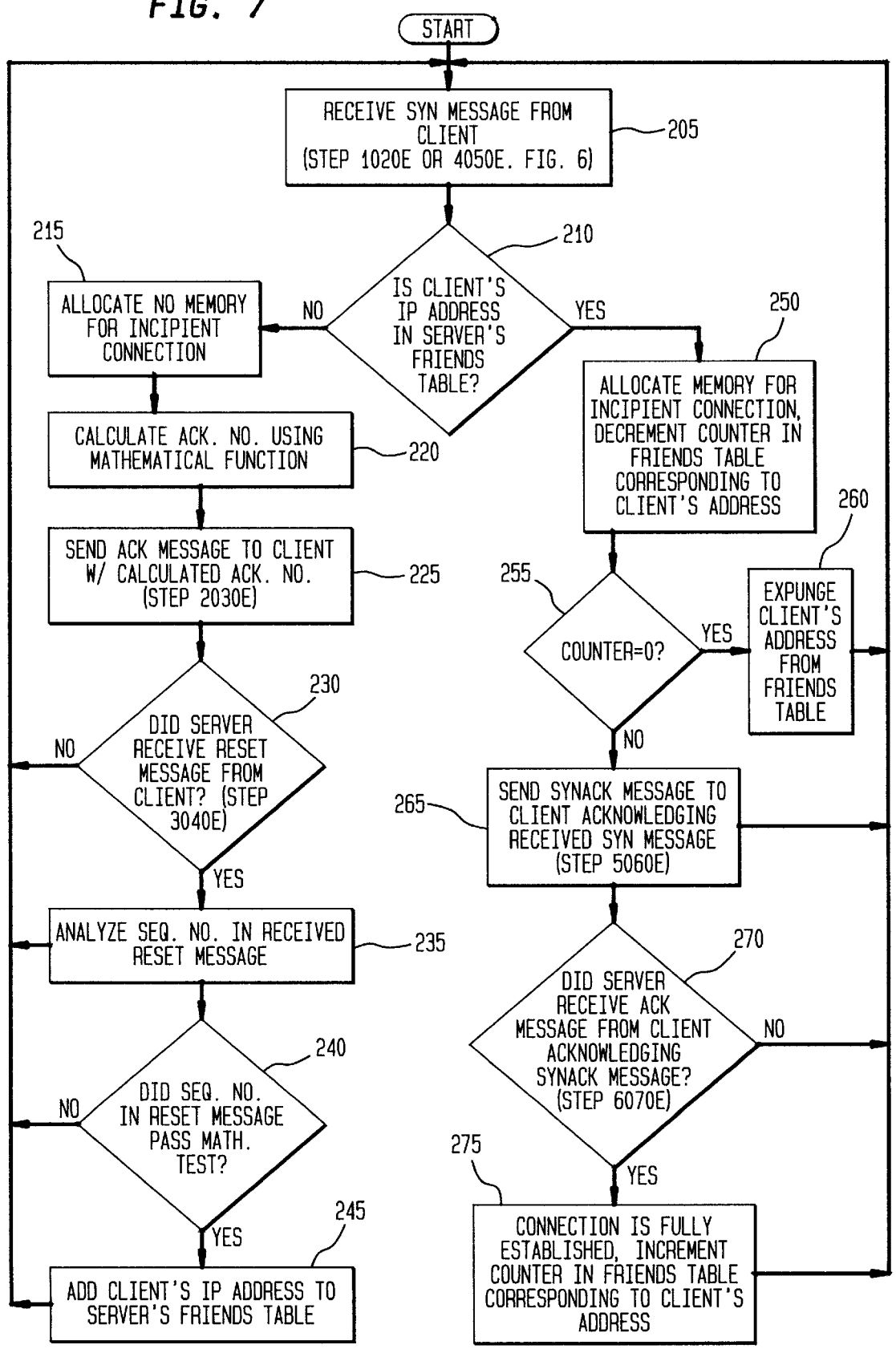
FIG. 7 illustrates a flow chart of the TCP2E protocol according to an embodiment of the present invention.

Referring to FIGS. 6 and 7, an example of the TCP2E protocol will now be described. FIG. 6 is a state table which illustrates an example of the TCP2E protocol. FIG. 7 illustrates a flow chart of the TCP2E protocol according to an embodiment of the present invention. Note that according to the usual principles of multitasking, each server and each client can implement multiple instances of the state machine described by this state table (FIG. 6). Typically there will be one instance for each connection or requested connection. Each instance will execute in parallel with other instances. Also note that FIG. 6 shows only the normal, expected steps; other state transitions or steps will be described below.

At the moment when the client sends a SYN message, it does not know whether the server is in state 10E or state 40E (FIG. 6), and therefore does not know whether the received SYN message will cause the 1020E step or the 4050E step. The difference is that in state 40E, the server's Friends Table has a record of this client (as indicated by "FT=X+Client") whereas in state 10E the Friends Table contains no such record (as indicated by "FT=X").

Initially, client 105 sends a SYN message to server 110 with a request to open a TCP connection. This SYN message is either step 1020E or step 4050E, depending on the state of the server's Friends Table. In this SYN message, the SYN flag is set to indicate that the three-way TCP connection handshake is beginning. The sequence number is set to 400 (in this example) and the SYN message specifies several options requested by client 105 in the options field of the TCP header.

At step 205 of FIG. 7, server 110 receives the SYN message from client 105. At step 210 of FIG. 7, server 110 compares the client's IP address (source IP address) in the received SYN message to the server's Friends Table. If the client's address is not on the server's Friends Table, the SYN message puts the server into state 20E (FIG. 6) and flow of the TCP2E protocol proceeds to steps 2030E and 3040E (FIG. 6), which corresponds to the left branch of FIG. 7 (steps 215–245). At this point, the server has not yet determined whether SYN message is an attack packet or a legitimate connection request.

Alternatively, if the client's address is on the server's Friends Table, the received SYN message is puts the server into state 50E, and flow of the TCP2E protocol proceeds to steps 5060E, 6070E, and 7080E (FIG. 6), corresponding to the right branch of FIG. 7 (steps 250–275).

Steps 2030E and 3040E of FIG. 6 (the left branch in FIG. 7) will be described first. At step 215 of FIG. 7 (after server 110 determines that the client's address is not on the server's Friends Table), server 110 performs only the minimal communication and computation, and allocates no memory resources for the requested connection. At step 220 of FIG. 7, server 110 calculates an acknowledgment number $c as a mathematical function that depends upon at least the IP address of client 105 and a secret known only to server 110.

Depending on the embodiment, server 110's acknowledgment number $c (in message 2030E) can be a cryptologic function which depends upon one or more additional parameters (in addition to the secret and client 105's IP address), including: client's port, server's IP address, server's port, among other things. For example, server 110's acknowledgment number $c can be calculated as follows:

$$\$c = MD5 \text{ hash (client's IP address, client's port, server's IP address, server's port, random secret).} \qquad (\text{Eq. 3})$$

It does not matter what number is chosen as the server's initial sequence number in the ACK message of step 2030E (as indicated in FIG. 6 as SEQ=??) because the reset message in step 3040E does not make any use of the sequence number specified in step 2030E. At this point, server 110 need not allocate memory to store its acknowledgment number $c, client 105's IP address or port, client 105's initial sequence number (400 in step 1020E of FIG. 6), client 105's window size, client 105's requested options, or other information regarding the requested connection.

At step 225 of FIG. 7 (step 2030E of FIG. 6), an ACK message containing the acknowledgment number calculated at step 220 is sent to client 105.

At step 230 of FIG. 7, server 110 determines whether it has received a reset message from client 105. A client which is legitimately attempting to establish a TCP connection with server 110 and which, therefore, is not IP spoofing, will receive the ACK message sent in step 225. A client which is IP spoofing will not receive the ACK message because the ACK message will be routed to the bogus IP address that the client specified as the source-address of the original SYN message. A legitimate client receiving the ACK message of step 2030E will recognize that the acknowledgment number of this ACK message does not acknowledge any messages sent by client 105. This condition appears to client 105 as a half-open connection, and the detection and proper response to such a condition is specified by TCP (see, e.g., Pages 32–33, RFC793). In accordance with TCP, client 105 will respond to the ACK message of step 2030E by sending the reset message of step 3040E with a sequence number=$c. As specified by TCP, the sequence number of the reset message 3040E is equal to the acknowledgment number of the ACK message of step 2030E.

At step 235 of FIG. 7 and in response to receiving the reset message of step 3040E, server 110 analyzes the sequence number in the reset message to determine if the sequence number in the reset message passes the appropriate mathematical (i.e., cryptologic) test. If the reset message fails the test, the server will return to state 10E (rather than proceeding to state 40E), making a transition that is not explicitly shown in FIG. 6.

As one example of the appropriate cryptologic test, server 110 recalculates the output $c of the cryptologic function that was used in the message of step 2030E using the parameters in the reset message of step 3040E. As another example, the client 105 need not return the value $c verbatim, but could return another value $d that depends on $c in a way known (i.e, based on a mathematical function) to the server 110, so that the server can recalculate $d. Server 110 then compares this recalculated value ($c or $d, as appropriate) to the sequence number present in the reset message of step 3040E. If a match is found, then this confirms to server 110 that the reset message of step 3040E is a proper response to the ACK, and thus, the sequence number in the reset message passes the cryptologic test. Preferably, $d=$c.

Note that the acknowledgment number $c or $d calculated by server 110 and provided in the message of step 2030E should not be dependent on the client's initial sequence number (400 in the message of step 1) because client 105 does not repeat its initial sequence number in the reset message of step 3040E, and any such dependence would disrupt the cryptologic test.

Therefore, a match between the calculated value of the cryptologic function and the sequence number in the reset message of state 3040E indicates that client 105 is currently complying with TCP and, therefore, cannot be a part of any widely-known SYN Flood attack. If client 105 does not seek to establish a legitimate connection with server 110, but rather, only seeks to attack or otherwise harass server 110, client 105's IP address and port are known to server 110 and simple trace methods can now be used to identify client 105.

Under TCP, sending a reset command to server 110 causes a server to release all resources that have been allocated for the incipient connection. As a result, a malicious client typically would not issue the reset message of step 3040E because this would largely defeat the purpose of the SYN Flood attack. Moreover, a client responding to the ACK message of step 2030E indicates that the client's IP address in the message sent in step 1020E is correct, thereby permitting server 110 to identify the attacking client using standard trace methods.

At step 245 of FIG. 7 and after having received the reset message of step 3040E which passed the appropriate cryptologic test, server 110 then updates the server's Friends Table by adding the client's IP address (or other identifying information) to the Friends Table.

In accordance with TCP, immediately after sending the reset message of step 3040E, client 105 sends another SYN message. This second SYN message corresponds to the message of step 4050E (FIG. 6) if the client's address has been added to the Friends Table (otherwise this second SYN message corresponds to step 1020E). This second SYN message of step 4050E is received by server 110 (corresponding again to step 205 of FIG. 7). Notice that client 105 resends its requested options in this second SYN message of step 4050E. Therefore, there was no need for server 110 to store the options requested by client 105 in step 1020E.

Steps 5060E and 6070E of FIG. 6 (the right branch in FIG. 7) will now be described. At step 210 of FIG. 7, server 110 compares the client's IP address in the second SYN message (of step 4050E) to the server's Friends Table and finds a match, and therefore proceeds to step 250 of FIG. 7.

At step 250 of FIG. 7, server 110 can safely allocate a full Transmission Control Block in memory to store all the information regarding the incipient connection as performed in TCP, including the client's requested options (requested in the second SYN message of step 4050E). Because a SYN message was received from client 105, server 110 decrements the counter in the Friends Table corresponding to the client 105's IP address.

At step 255, server 110 determines whether the counter corresponding to the client's IP address is above a specific threshold value. In this embodiment, server 110 determines whether the counter is greater than zero. If the counter is not greater than zero, the client's IP address is expunged or deleted from the Friends Table, step 260. The reason for this deletion is to handle the case where a previously compliant client has crashed, and an attacker is using that client's IP address in the source-address field of attack packets. By initializing the counter to a modest value, the attacker can consume only a modest amount of server 110's resources, and only then in the unusual case where a client in the server's friends table has crashed. On the other hand, the reason for implementing the counter, and initializing it to a value greater than 1, is that it allows the server 110 to accept more than one connection from the client 105 without going through the overhead of demanding a reset message from the client each time.

If the counter is greater than the threshold value, the flow proceeds to step 265 of FIG. 7 (corresponding to step 5060E of FIG. 6), where server 110 sends a SYNACK message to client 105 acknowledging the received SYN message. Client 105 then sends the ACK message of step 6070E of FIG. 6, to server 110.

At step 270 of FIG. 7, server 110 determines whether it has received the ACK message (step 6070E) from client 105 acknowledging the SYNACK message (sent by server 110 at step 265 of FIG. 7, step 5060E of FIG. 6). If server 110 does not receive an ACK message from client 105 acknowledging the SYNACK message sent at step 265, server 110 aborts the incipient connection and flow proceeds back to step 205 to wait for the next SYN message.

At step 270 of FIG. 7, if server 110 receives the ACK message acknowledging the SYNACK message of step 265, the connection is now fully established, and the counter in the Friends Table corresponding to the client's address is incremented by a set amount (i.e., the counter is incremented by two), subject to a predetermined maximum.

At step 7080E of FIG. 6, client 105 now sends data to server 110. Steps 4050E, 5060E and 6070E of FIG. 6 are the same as steps 1020A, 2030A, and 3040A of TCP (FIG. 1), except the TCP2E protocol (FIGS. 6 and 7) involves using a Friends Table and a counter corresponding to the client.

In this example of TCP2E, because the counter is decremented by one at step 250 after server 110 receives a SYN message from client 105, and is incremented by two whenever a connection is fully established (at step 275), several unsuccessful connection attempts in a row by client 105 would typically result in the counter being decremented to zero and the client's address being expunged from the server's Friends Table. After the client's IP address has been expunged from the Friends table, a subsequent SYN message from client 105 requesting a TCP connection with server 110 which is operating the TCP2E protocol would cause server 110 to process the subsequent connection request using the left branch of FIG. 7 (steps 215–245) because the client's address is no longer in the server's Friends Table (step 210, FIG. 7). During processing of this subsequent connection request using the left branch of FIG. 7, if server 110 receives a reset message from client 105 having a sequence number that passes the appropriate mathematical test (step 240 of FIG. 7), then server 110 adds the IP address of client 105 to the Friends Table and initializes the corresponding counter to a predetermined value (e.g., five).

The TCP2E protocol offers a greatly improved defense to a SYN Flood attack as compared to TCP because a Transmission Control Block will not be allocated upon receipt of a SYN message unless the client's address is on the server's Friends Table. Once a client's address has been added to the Friends Table, the TCP2E protocol provides greater efficiency in processing connection requests (i.e., SYN messages) than provided by the Bernstein/Schenk Syncookie method. Also, unlike the Bernstein/Schenk Syncookie method, the TCP2E protocol allows a server to implement all client requested options.

Second-Level Protocols

Figure 8:
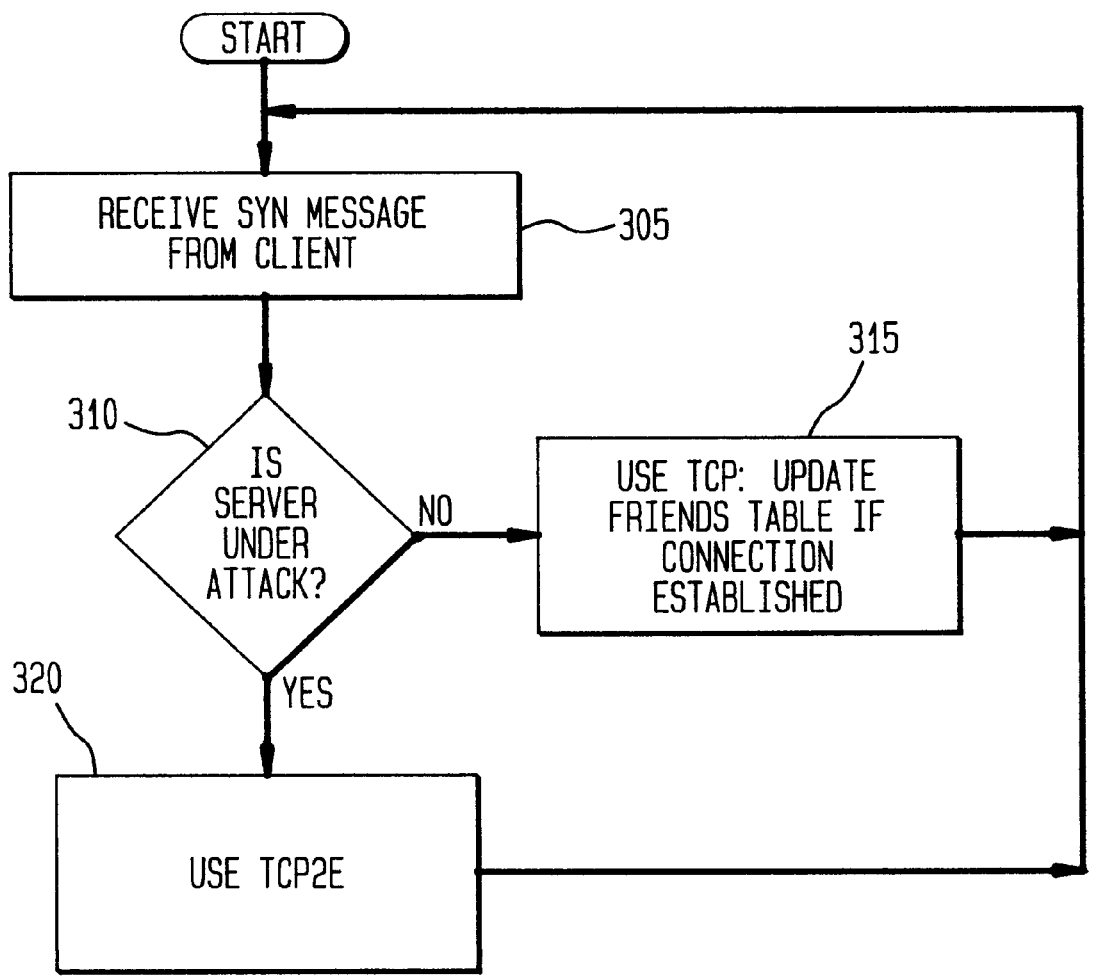
FIG. 8 illustrates a flow chart of a second level protocol according to an embodiment of the present invention.

The second-level protocol according to several embodiments of the present invention will now be described. FIG. 8 illustrates a flow chart of a second level protocol according to an embodiment of the present invention. At step 305, server 110 receives a SYN message from a client. At step 310, server 110 determines whether it is under a SYN Flood attack. There are several types of information a server can use to determine whether it may be under attack. One source of information is to keep track of the number of recent incoming TCP connection setup requests (SYN messages) from all clients and keep track of the number of such messages that resulted in fully established connections. If the ratio of the number of connection requests that resulted in fully established connections to the total number of connection requests over a given period of time drops below a threshold level (for example 50%), this indicates that defensive measures should be applied to protect the server. (Note that this same approach of calculating the ratio of the number of successful connections established to the number of connection requests from a particular client could be used at steps 250, 255 and 270 of FIG. 7 to determine when a client's address should be expunged. For example, two counters can be used, one counter for total connection requests from the client and another counter to keep track of the number of successful connections established.) Another type of information that can be used to determine whether a server may be under attack might be information from other servers as to whether they have recently been attacked. Additional information, including perhaps intelligence agencies' estimates of current threat levels, could be provided to server 110.

If at step 310 of FIG. 8, server 110 determines that it is not under attack (i.e., the above-described ratio is not below the threshold), then server 110 implements standard TCP, with no defensive measures. In other words, server 110 can allocate computational resources, communication resources, and a full Transmission Control Block in response to receiving each request for a TCP connection (SYN message). TCP should be used when possible because it is more efficient (i.e., fewer steps, less computational overhead) than the other first-level protocols.

If at step 310, server 110 determines that it is under attack, then server 110 uses TCP2E (FIGS. 6 and 7) to process the received SYN message. After processing the received SYN message, the flow proceeds back to step 305 where server 110 receives the next SYN message, and then to step 310 where server 110 again determines whether it is under attack. The number of connection requests that were successful and the total number of connection requests could have changed since the last time server 110 determined whether it was under attack (step 205). Server 110 uses these updated numbers to determine whether it is now under attack at step 310.

Figure 9:
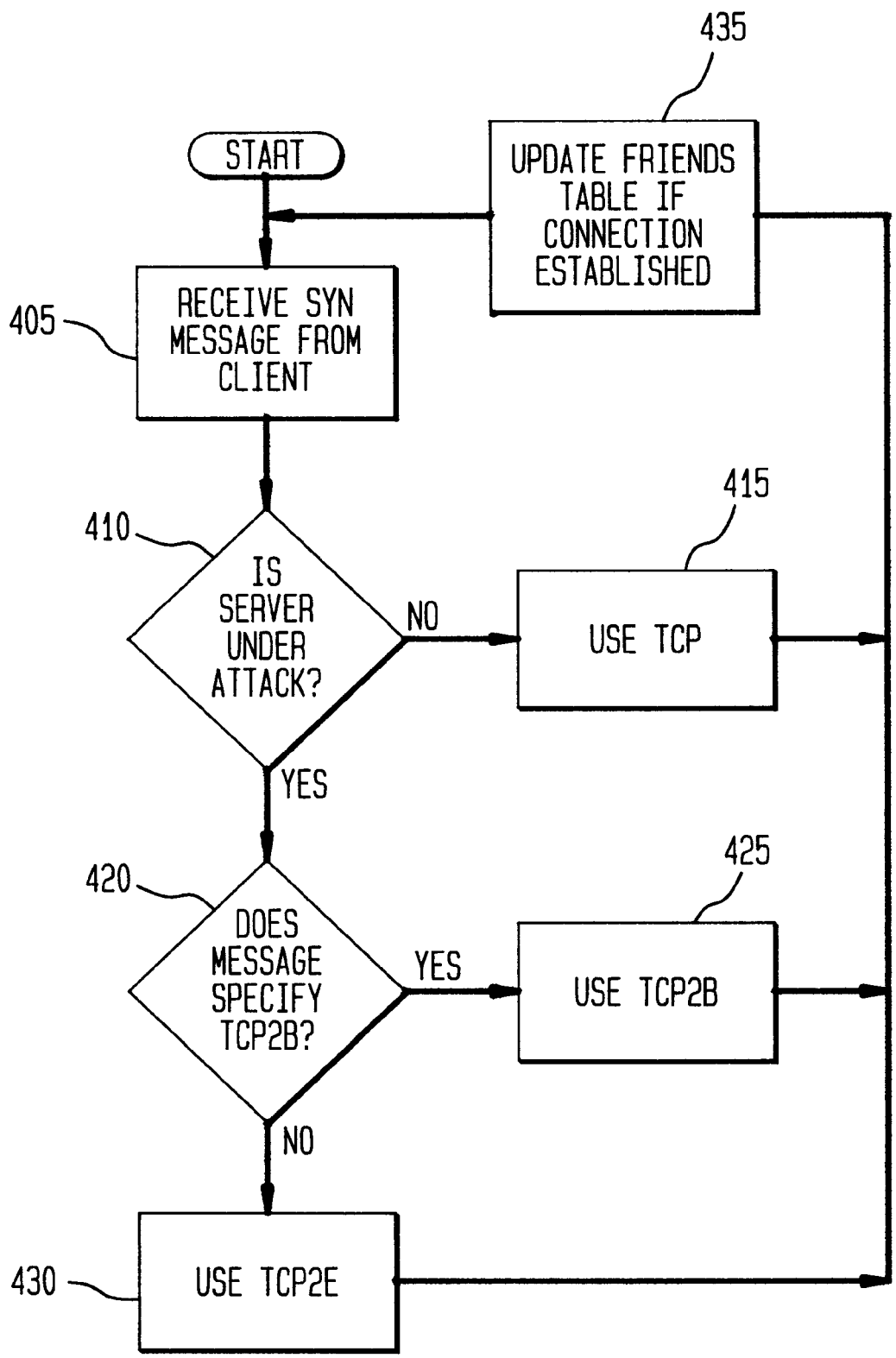
FIG. 9 illustrates a flow chart of a second level protocol according to another embodiment of the present invention.

FIG. 9 illustrates a flow chart of a second level protocol according to an embodiment of the present invention. At step 405, server 110 receives a SYN message from a client. At step 410, server 110 determines whether it is under attack. If it is not under attack, server 110 implements TCP, step 415.

If at step 410, server 110 determines that it is under attack, the flow proceeds to step 420, where server 110 determines whether or not the received SYN message indicates support for the TCP2B protocol. As described above in connection with the TCP2B protocol, support for the TCP2B protocol can be indicated in several alternative ways, but the present discussion focuses on the embodiment where TCP2B support is indicated by setting the TCP2B flag in the options field of the TCP header.

If at step 420, server 110 determines that the received SYN message specifies support for the TCP2B protocol, server 110 uses the TCP2B protocol to process the received message, step 425. The TCP2B protocol is more efficient than the TCP2E protocol. If server 110 determines that the received SYN message does not specify support for the TCP2B protocol, the received message is processed using the TCP2E protocol, step 430.

If a connection is fully established with server 110 using TCP, TCP2B or TCP2E, this indicates that the client is complying with TCP protocol and the address of the client is then added to the server's Friends Table to allow for more efficient processing of subsequent connection requests from this client, step 435. If a connection is not fully established, the client's address is not added to the server's Friends Table. Flow then proceeds back to step 405 to receive the next SYN message.

Figure 10:
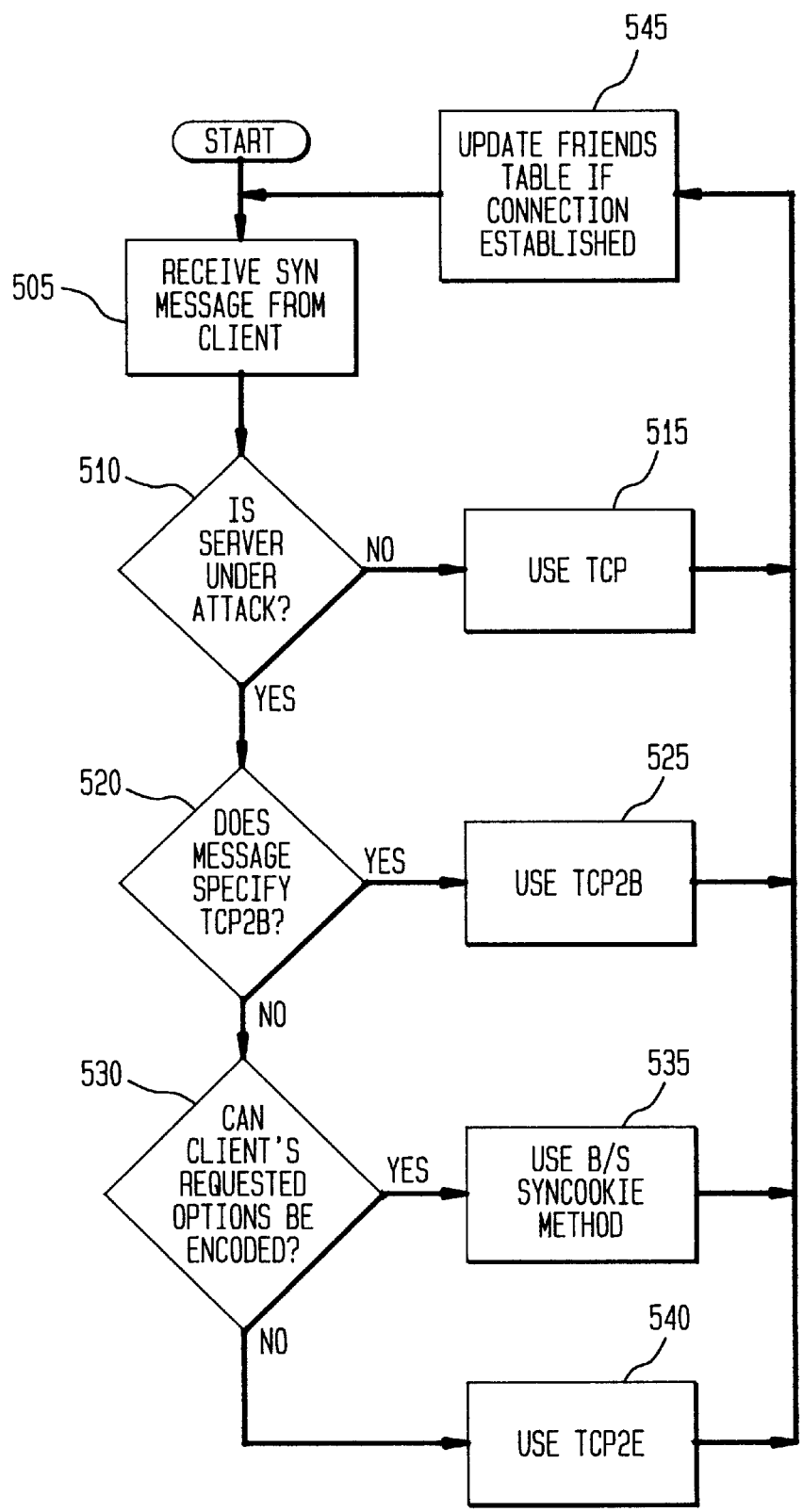
FIG. 10 illustrates a flow chart of a second level protocol according to another embodiment of the present invention.

FIG. 10 illustrates a flow chart of another second-level protocol according to another embodiment of the present invention. At step 505, server 110 receives a SYN message from client 105. At step 510, server 110 determines whether it is under attack. If it is not under attack, server 110 implements TCP, step 515. TCP is the most efficient first-level protocol and should be implemented when the server is not under attack.

If server 110 determines that it is under attack, then one of the remaining first level protocols which provides a defense to a SYN Flood attack should be selected and the flow proceeds to step 520.

At step 520, server 110 determines whether or not the received SYN message indicates support for the TCP2B protocol. If the received SYN message specifies support for the TCP2B protocol, server 110 processes the received SYN message using the TCP2B protocol, step 525.

If the received SYN message does not specify support for the TCP2B protocol (and the server is under attack), the flow proceeds to step 530. At step 530, server 110 determines whether the client's requested options can be encoded. If so, the Bernstein/Schenk Syncookie method is used to process the received SYN message, step 535.

If the client requested options cannot be encoded in the 32 bit sequence number, TCP2E protocol is used to process the received SYN message, step 540.

At step 545, server 110 updates its Friends table to add the address of the client if a TCP connection was established between the client and server 110 (using either TCP, TCP2B, the Bernstein/Schenk Syncookie method, or TCP2E). The process then returns to step 505 where server 110 receives the next SYN message.

Figure 11:
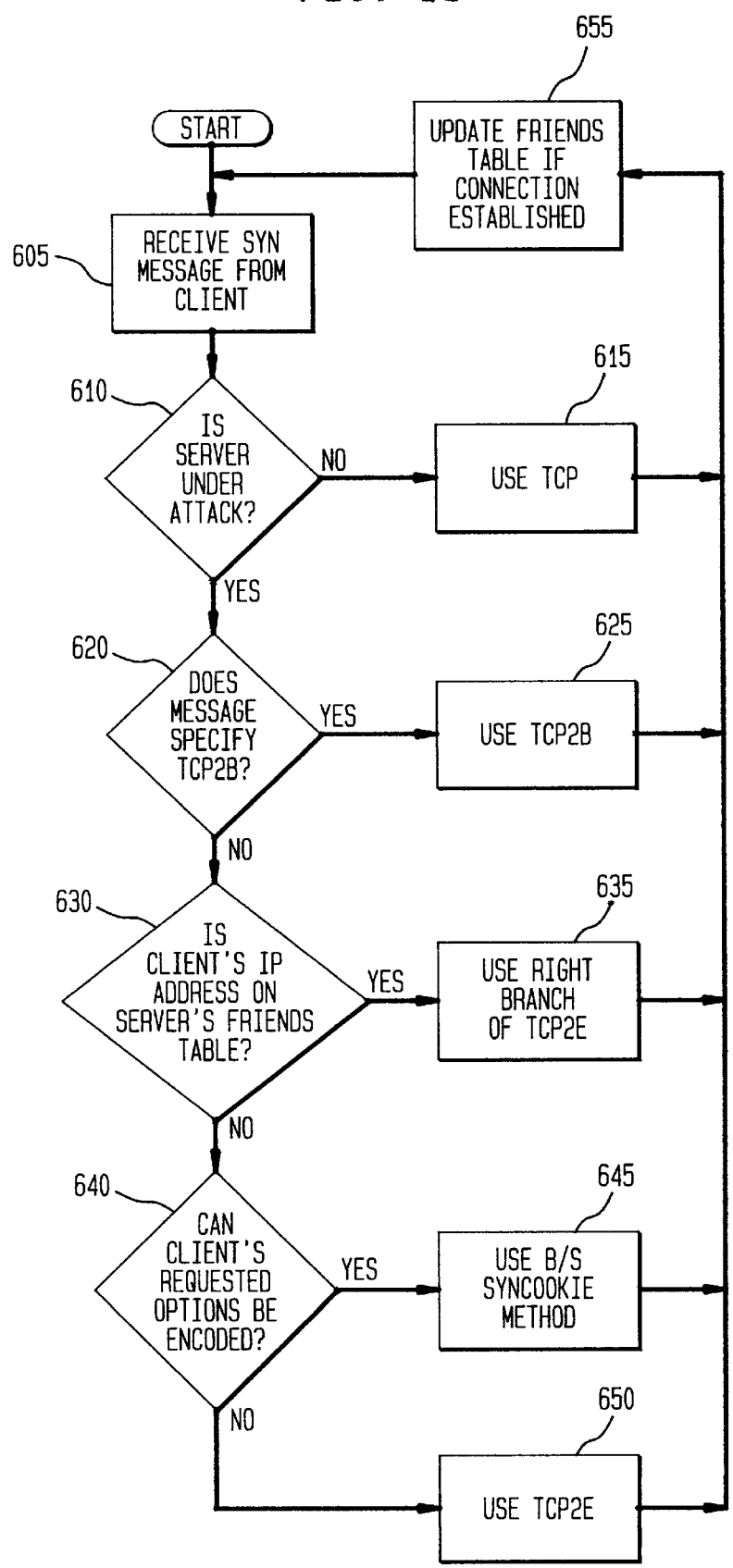
FIG. 11 illustrates a flow chart of a second level protocol according to another embodiment of the present invention.

FIG. 11 illustrates a flow chart of yet another second-level protocol according to another embodiment of the present invention. The more efficient first level protocols are selected when possible. The first level protocols can be generally ranked from most efficient to least efficient as follows:

| Level-1 Protocol | Applicability |
| --- | --- |
| 1. TCP | if there is little risk that the client will violate the protocol. |
| 2. Right Branch of TCP2E, FIG. 7 | if the client's address is on the Friends Table. |
| 3. TCP2B | if supported by the client |
| 4. Bernstein/Schenk Syncookie Nethod | if client requested options can be adequately encoded in the 32 bit sequence number |
| 5. Full TCP2E | always |

The first four options differ only slightly in their efficiency. For example, the first and second options require exactly the same communication, and differ only in the tiny computational effort required to keep the friends table up to date. The fifth option (TCP2E in the case where the client was not previously represented in the Friends Table) has the disadvantage that it requires an additional round-trip communication between client and server, but its great advantage is that it is always applicable, even when the other options are not. Therefore, according to a further embodiment of the present invention, in situations that satisfy the applicability conditions for more than one of the first-level protocols, the second-level protocol may choose from the applicable first-level protocols, choosing according to any predetermined order of preference, or even choosing randomly. However, it is desirable to avoid choosing full TCP2E when other options are applicable.

Referring to FIG. 11, steps 605–625 are the same as steps 505–525 respectively of FIG. 10. At step 630, server 110 determines whether the client's IP address (in the received SYN message) is on the server's Friends Table. If the client's address is on the server's Friend's Table, server 110 uses the right branch of TCP2E (FIG. 7), to process the received SYN message. The right branch of TCP2E is more efficient than the Bernstein/Schenk Syncookie method, and therefore, should be used when possible. If the client's address is not on the server's Friends Table, flow proceeds to step 640.

At step 640, server 110 determines whether the client requested options can be encoded (with the other information describing the incipient connection) in the 32 bit sequence number. If the client requested options can be encoded in the 32 bit sequence number, the Bernstein/ Schenk Syncookie method is used, step 645. Otherwise, if the client requested options cannot be encoded in the 32 bit sequence number, server 110 uses TCP2E to process the received SYN message, step 650. Next, flow proceeds to step 655 where server 110 updates its Friends Table if a TCP connection was established (regardless of the first level protocol which was used). It should be understood that the order of steps 620, 630 and 640 could be rearranged. For example, step 630 and the corresponding step 635 could be inserted before step 620 and corresponding step 625. Also, it is possible to remove one or more of steps 620 (and 625), 630 (and 635), and 640 (and 645 and 650).

The protocols of the present invention provide two new first-level protocols and several embodiments of a second-level protocol. The two new first-level protocols of the present invention include the TCP2B protocol and the TCP2E protocol. The protocols of the present invention provide a defense to SYN Flooding and permit implementation of all client requested options.

The protocols of the present invention provide an excellent defense to SYN Flooding because no memory resources need be allocated in response to the initial SYN message. Rather, the full transmission control block (TCB) is allocated only after confirming that the client is complying with at least a portion of TCP.

According to the present invention, there are several ways to confirm that the client is complying with at least a portion of TCP. A Friends Table can be used to identify those devices recently observed to be complying with TCP (TCP2E). Alternatively, a traceable communication path can be established from the server 110 to client 105. For example, the server 110 can prompt a reset message from the client by sending a message that indicates a half-open connection (TCP2E protocol). In such a case, a reset message indicates that the client is complying with TCP and establishes a traceable communication path to the client (and also confirms the IP address of the client). Alternatively, encoded values can be communicated between client and server and confirmed according to the TCP2B protocol.

In addition, according to the present invention, all client requested options can be implemented since options are not limited by the 32 bit sequence number as performed in the Syncookie method. In fact, only 22 bits are available in the Syncookie method for encoding client requested options because 10 of the 32 bits of the sequence number must be used for encoding additional information (i.e., client address, port number, sequence number). As a result, many client requested options are not provided to the server for implementation in the Syncookie method. The present invention overcomes these limitations and disadvantages of the Syncookie method.

Also, according to the present invention, these goals can be accomplished without the performance penalty that would be incurred using blaze's method (which requires waiting for a timeout to occur).

What is claimed is:

1. A method of processing at a second device a message from a first device requesting a connection with the second device, said method comprising the steps of:

receiving a first message at a second device from a first device, said first message requesting a connection with the second device and including the address of the first device and one or more options requested by the first device;

determining if the first message indicates that the first device supports a predetermined protocol; and performing the following steps a)–c) only if the first device supports the predetermined protocol;

a) sending a second message to the first device indicating that the second device supports the predetermined protocol;

b) receiving a third message at the second device from the first device in response to the second message, said third message repeating said one or more options which were requested by the first device in the first message; and c) allocating memory resources at the second device to establish the connection between the first and second devices.

2. A method of establishing a connection between a first device and a second device, said first and second devices being coupled together via a communication network, said method comprising the steps of:

receiving at the second device a first message from the first device requesting a connection with the second device, said first message requesting one or more options and indicating the address of the first device, said first message also indicating that said first device supports a predetermined protocol;

detecting at the second device that the received first message indicates that said first device supports the predetermined protocol;

calculating a first encoded value, said first encoded value being calculated as a first predetermined mathematical function based on at least the address of the first device and a secret known only to the second device;

storing the secret on the second device;

sending a second message from the second device to the first device, said second message acknowledging receipt of the first message and including the calculated first encoded value, said second message also indicating that said second device also supports said predetermined protocol;

receiving a third message at the second device from the first device, said third message indicating the address of the first device and requesting said one or more options which were requested in said first message, said third message including a return value calculated according to a second predetermined mathematical function depending on at least the first encoded value;

calculating a second encoded value, said second encoded value being calculated based on the first and second predetermined mathematical functions and using at least the address of the first device in the third message and the stored secret as arguments;

comparing the second encoded value to the return value;

allocating memory resources at the second device to fully establish a connection between the first and second devices only if there is a match between the second encoded value and the return value based on said step of comparing.

3. The method of claim 2 wherein said first predetermined mathematical function comprises a cryptologic function.

4. The method of claim 3 wherein said cryptologic function comprises the MD5 hash function.

5. The method of claim 2 wherein said step of calculating the first encoded value comprises the step of calculating the first encoded value using a cryptologic function based on at least the address and port of the first device, the address and port of the second device, and a secret known only to the second device.

6. The method of claim 5 wherein said step of calculating the second encoded value comprises the step of calculating the second encoded value using said cryptologic function based on at least the address and port of the first device included in the third message, the address and port of the second device, and the secret known only to the second device.

7. The message of claim 2 wherein said first message is a TCP compliant SYN message requesting a TCP connection with the second device, said second message is a TCP compliant SYNACK message, and said third message is a TCP compliant ACK message.

8. The method of claim 2 wherein said step of sending the second message comprises the step of sending the second message from the second device to the first device, said second message acknowledging receipt of the first message and including the calculated first encoded value as an option in the second message, said second message also indicating that said second device also supports said extended protocol.

9. The method of claim 8 wherein said step of receiving the third message comprises the step of receiving the third message at the second device from the first device, said third message indicating the address of the first device and including as options in the third message said one or more options which were requested in said first message, said third message including said first encoded value passed as an option from the first device back to the second device.

10. The method of claim 2 wherein the first message includes information as an option that indicates that the first device supports the predetermined protocol, and said second message includes information as an option that indicates that the second device supports the predetermined protocol.

11. A method of establishing a connection between a first device and a second device, said first and second devices being coupled together via a communication network, said method comprising the steps of:

sending a first message from the first device to the second device requesting a connection with the second device, said first message requesting one or more options, said first message including the address of the first device and information indicating that said first device supports a predetermined protocol;

receiving at the second device the first message and detecting said information indicating that said first device supports the predetermined protocol;

calculating a first encoded value as a mathematical function of at least the address of the first device included in the first message;

sending a second message from the second device to the first device, said second message including the calculated first encoded value and information indicating that said second device supports said predetermined protocol;

receiving at the first device said second message;

sending a third message from the first device to said second device in response to said second message, said third message including the address of the first device and repeating the options included in the first message;

receiving at the second device the third message; and establishing a connection between the first and second devices if said third message passes a mathematical test.

12. A method of processing at a second device a message from a first device requesting a connection with the second device using a predetermined protocol, said second device storing a list of one or more compliant devices, said method comprising the steps of:

receiving a first message at a second device from a first device, said first message requesting a connection with the second device and including the address of the first device;

comparing the address of the first device to the list of compliant devices;

allocating memory resources at the second device to allow the requested connection to be established if the address of the first device is on the list;

sending a second message from the second device to the first device if the address of the first device is not on the list, said second message containing information which will prompt the first device to send a reset message to the second device if the first device is complying with the predetermined protocol; and adding the address of the first device to the list if the second device receives the reset message from the first device.

13. The method of claim 12, wherein said predetermined protocol comprises TCP, said first message comprises a SYN message, and said second message comprises an ACK message.

14. A method of processing at a second device a message from a first device requesting a connection with the second device, said second device storing a list of compliant devices, said method comprising the steps of:

receiving a first message at a second device from a first device, said first message requesting a connection with the second device and including the address of the first device;

comparing the address of the first device to the list;

allocating memory resources at the second device to allow the requested connection to be established if the address of the first device is on the list;

performing the following steps a)–c) if the address of the first device is not on the list:
 a) calculating an encoded value as a mathematical function based on at least the address of the first device and a secret known only to the second device;
 b) sending a second message from the second device to the first device, said second message including the calculated encoded value as the acknowledgment number in the second message; and
 c) adding the address of the first device to the list if the second device receives a reset message from the first device which includes the encoded value as a sequence number.

15. The method of claim 14 and further comprising the steps of:

recalculating, in response to receiving the reset message, the encoded value using the mathematical function based on at least the address of the first device included in the reset message and the secret known only to the second device; and said step of adding comprises the steps of:
 a) comparing the recalculated encoded value to the encoded value included in the reset message as the sequence number; and
 b) adding the address of the first device to the list only if there is a match between the recalculated encoded value and the encoded value included as the sequence number of the reset message.

16. The method of claim 14 wherein said mathematical function comprises a cryptologic function.

17. A method of processing at a second device a message from a first device requesting a connection with the second device, said second device storing a list of compliant devices, the list also comprising of a counter associated with each device on the list, each said counter providing an indication of the number of connection attempts as compared to the number of successful connections established from the associated device, said method comprising the steps of:

receiving a first message at a second device from a first device, said first message requesting a connection with the second device and including the address of the first device;

determining whether the address of the first device is initially on the list;

performing the following steps a) and b) if the address of the first device is not initially on the list:
 a) sending a second message from the second device to the first device; and
 b) adding information identifying the first device to the list if the second device receives a reset message from the first device in response to the second message;

otherwise, performing the following steps c)–e) if the address of the first device is initially on the list:
 c) updating the counter on the list associated with the first device to reflect the received first message requesting a connection with the second device; and
 d) deleting information identifying the first device from the list only if the counter associated with the first device indicates an excessive number of connection attempts from the first device as compared to the number of successful connections established between the first and second devices; and
 e) performing the following steps if the address of the first device was not deleted from the list at said step d):
  1) allocating memory resources at the second device to allow the requested connection to be established; and
  2) updating the counter associated with the first device to reflect the establishment of a successful connection if a connection between the first and second devices is successfully established.

18. A method of establishing a connection between a first device and a second device, said second device storing a list of compliant devices, said first and second devices being coupled together via a communication network, said method comprising the steps of:

receiving a first message at the second device from the first device, said first message requesting a connection between the first device and the second device, said first message including the address of the first device;

comparing the address of the first device to the list;

using TCP to process the first message if the address of the first device is on the list; and performing the following steps a)–e) if the address of the first device is not on the list:
 a) calculating a first encoded value based on at least the address of the first device included in the first message;
 b) sending a second message to the first device including the first encoded value;
 c) receiving a third message at the second device from the first device which includes a return value, said third message requesting a reset of the connection between the first and second devices;
 d) determining whether or not the third message passes a mathematical test; and
 e) adding information identifying the first device to the list only if the third message passes the mathematical test.

19. A method of processing at a second device a message from a first device requesting a connection with the second device, said second device storing a list of compliant devices, said method comprising the steps of:

receiving a first message at a second device from a first device, said first message requesting a connection with the second device and including the address of the first device;

determining whether the second device may be under attack;

using TCP to process the first message and permitting a connection between the first and second devices to be established if it is determined that the second device is not under attack;

otherwise, performing the following steps a)–c) if it is determined that the second device may be under attack:
 a) comparing the address of the first device to the list;
 b) allocating memory resources at the second device to allow the requested connection to be established if the address of the first device is on the list;
 c) performing the following steps 1)-2) if the address of the first device is not on the list:
  1) sending a second message from the second device to the first device; and
  2) adding information identifying the first device to the list if the second device receives a reset message from the first device in response to the second message.

20. The method of claim 19 wherein said step of determining whether the second device may be under attack comprises the steps of:

keeping track of the number of connection requests to the second device;

keeping track of the number of connection requests to the second device that resulted in an established connection; and determining that the second device may be under attack only if the ratio of the number of connection requests that resulted in an established connection to the number of connection requests is less than a threshold value.

21. A method of processing at a second device a message from a first device requesting a connection with the second device, said second device storing a list of compliant devices, said method comprising the steps of:

receiving a first message at a second device from a first device, said first message requesting a connection with the second device and including the address of the first device and one or more options requested by the first device;

determining whether the second device may be under attack;

using TCP to process the first message and permit a connection between the first and second devices to be established if it is determined that the second device is not under attack;

otherwise, performing the following steps a)–c) if it is determined that the second device is not under attack:
 a) determining whether the first message indicates that the first device supports a predetermined protocol;
 b) performing the following steps 1)–3) if the first device supports the predetermined protocol;
  1) sending a second message to the first device indicating that the second device supports the predetermined protocol;
  2) receiving a third message at the second device from the first device in response to the second message, said third message repeating said one or more options requested by the first device in the first message; and
  3) allocating memory resources at the second device to establish the connection between the first and second devices;
 c) otherwise, if the first device does not support the predetermined protocol, then performing the following steps 4)–7):
  4) comparing the address of the first device to the list;
  5) using TCP to process the first message and permit a connection between the first and second devices to be established only if the first device is on the list;
  6) sending a second message to the first device if the first device is not on the list; and
  7) adding the address of the first device to the list only if the second device receives a reset message from the first device in response to the second message sent at step 6).

22. A method of establishing a connection between a first device and a second device, said first and second devices being coupled together via a communication network, said method comprising the steps of:

exchanging at least three messages between the first and second devices, said first device requesting a connection with the second device and requesting one or more options in at least one of said messages;

establishing a traceable communication path from the second device to the first device;

allocating a full transmission control block for the connection at the second device only after said traceable communication path has been established; and wherein all of said one or more options requested by said first device are received by said second device for implementation.

23. The method of claim 22 wherein said step of establishing a communication path comprises the step of identifying the first device.

24. The method of claim 22 wherein said step of establishing a communication path comprises the step of determining that at least one of said three exchanged messages specifies a correct address for said first device.

25. The method of claim 22 wherein said step of establishing a communication path comprises the step of determining that the first device responds to a half-open connection in substantial compliance with TCP by sending a reset message to the second device.

26. The method of claim 22 wherein said step of establishing a communication path comprises the steps of:

said first device indicating its support for a predetermined protocol and requesting a connection in a first message, said first device including one or more requested options;

said second device indicating its support for the predetermined protocol by sending a second message to the first device, said second message including an encoded value; and said first device sending a third message to the second device including a return value and repeating the one or more requested options; and determining at the second device that the return value passes a mathematical test.

27. The method of claim 22 wherein said step of allocating comprises the step of allocating a full transmission control block for the connection at the second device only after said traceable communication path has been established, said full transmission control block including at least information describing the identity of the first device, and the one or more requested options.

28. The method of claim 27 wherein said step of allocating comprises the step of allocating a full transmission control block for the connection at the second device only after said traceable communication path has been established, said full transmission control block including at least a representation of the IP address and port number of the first device, the one or more options requested by the first device, and a sequence number provided in one of said messages from the first device.

29. A method of establishing a connection between a first device and a second device, said first and second devices being coupled together via a communication network, said method comprising the steps of:

exchanging at least three messages between the first and second devices, said first device requesting a connection with the second device and requesting one or more options in at least one of said messages;

establishing a traceable communication path from the second device to the first device;

allocating a full transmission control block for the connection at the second device only after said traceable communication path has been established; and wherein more than 22 bits are available for said first device to request said one or more options.

30. A method of establishing a connection between a first device and a second device, said first and second devices being coupled together via a communication network, said method comprising the steps of:

exchanging at least three messages between the first and second devices, said first device requesting a connection with the second device and requesting one or more options in at least one of said messages;

confirming that the first device is complying with at least a portion of TCP;

allocating a full transmission control block for the connection at the second device only after it has been confirmed that the first device is complying with at least a portion of TCP; and wherein all of said one or more options requested by said first device are received by said second device for implementation.

* * * * *